United States Patent
Herbst

(10) Patent No.: US 7,968,071 B2
(45) Date of Patent: Jun. 28, 2011

(54) $XLI_2MGH_n$ HYDRIDES AS HYDROGEN STORAGE COMPOUNDS

(75) Inventor: Jan F. Herbst, Grosse Pointe Woods, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 36 days.

(21) Appl. No.: 12/539,639

(22) Filed: Aug. 12, 2009

(65) Prior Publication Data

US 2011/0038776 A1 Feb. 17, 2011

(51) Int. Cl.
*C01B 6/24* (2006.01)
*C01F 17/00* (2006.01)

(52) U.S. Cl. ...... 423/263; 420/900; 423/644; 429/218.2

(58) Field of Classification Search .......... 423/644–647, 423/263; 420/900; 429/218.2
See application file for complete search history.

(56) References Cited

U.S. PATENT DOCUMENTS

| 7,618,607 | B2 * | 11/2009 | Herbst | ......... 423/263 |
| 2007/0116623 | A1 * | 5/2007 | Chen et al. | ......... 423/351 |
| 2008/0305024 | A1 | 12/2008 | Herbst | |

OTHER PUBLICATIONS

Takasaki et al. "High-pressure synthesis of novel hydrides Mg7-xAxTiH16-x (A= Li, Na, K,x=0–1.0) and their reversible hydrogen storage properties" Journal of Alloys and compounds, 2010, 494, p. 439-445.*

* cited by examiner

*Primary Examiner* — Wayne Langel
*Assistant Examiner* — Syed Iqbal
(74) *Attorney, Agent, or Firm* — Reising Ethington P.C.

(57) ABSTRACT

State-of-the-art electronic structure calculations provide the likelihood of the availability of $AlLi_2MgH_n$, $ScLi_2MgH_n$, $TiLi_2MgH_n$, $VLi_2MgH_n$, $CrLi_2MgH_n$, $MnLi_2MgH_n$, $FeLi_2MgH_n$, $CoLi_2MgH_n$, $NiLi_2MgH_n$, $CuLi_2MgH_n$, $ZnLi_2MgH_n$, $GaLi_2MgH_n$, $GeLi_2MgH_n$, $PdLi_2MgH_n$, $AgLi_2MgH_n$, $CdLi_2MgH_n$, $InLi_2MgH_n$, $SnLi_2MgH_n$, $SbLi_2MgH_n$, $PtLi_2MgH_n$, $AuLi_2MgH_n$, $HgLi_2MgH_n$, $TlLi_2MgH_n$, $PbLi_2MgH_n$, and $BiLi_2MgH_n$ (here n is an integer having a value in a particular compound of 4-7) as solid hydrides for the storage and release of hydrogen. Different hydrogen contents may be obtained in compounds having the same $XLi_2Mg$ crystal structures. These materials offer utility for hydrogen storage systems.

9 Claims, 1 Drawing Sheet

XLI$_2$MGH$_n$ HYDRIDES AS HYDROGEN STORAGE COMPOUNDS

TECHNICAL FIELD

This invention pertains to compounds useful for solid-state storage of hydrogen. More specifically, this invention pertains to a family of new hydride compounds, XLi$_2$MgH$_n$, where X may be Al, Sc, Ti, V, Cr, Mn, Fe, Co, Ni, Cu, Zn, Ga, Ge, Pd, Ag, Cd, In, Sn, Sb, Pt, Au, Hg, Tl, Pb, or Bi. Many of these hydride compounds have known non-hydrogen-containing analog compounds, XLi$_2$Mg, and the combinations of hydrides and non-hydrogen containing compounds may provide the basis for useful hydrogen storage systems.

BACKGROUND OF THE INVENTION

Considerable development effort is currently being expended on the development of hydrogen and oxygen consuming fuel cells, and there is also interest in hydrogen burning engines. Such power systems require means for storage of hydrogen fuel which hold hydrogen in a safe form at ambient conditions and which are capable of quickly receiving and releasing hydrogen. In the case of automotive vehicles, fuel storage is required to be on-board the vehicle, and storage of hydrogen gas at high pressure is generally not acceptable for such applications.

These requirements have led to the study and development of solid-state compounds for temporary storage of hydrogen, often as hydrides. For example, sodium alanate, NaAlH$_4$, can be heated to release hydrogen gas, and a mixture of lithium amide, LiNH$_2$, and lithium hydride, LiH, can be heated and reacted with the same effect. Despite such progress, however, no known solid-state system currently satisfies targets for on-board vehicular hydrogen storage.

Certain compounds, XLi$_2$Mg, where X is Al, Zn, Ga, Ge, Ag, Cd, In, Sn, Sb, Au, Hg, Tl, Pb, and Bi are known to exist. It is an object of this invention to determine whether corresponding hydrides, XLi$_2$MgH$_n$, may be formed that could serve with such compounds in hydrogen storage combinations of hydrogen releasing and hydrogen accepting compounds.

SUMMARY OF THE INVENTION

This invention involves the use of state-of-the-art density functional theory to examine the possible formation of XLi$_2$Mg materials and their hydrides with X being any of the elements Al, Sc, Ti, V, Cr, Mn, Fe, Co, Ni, Cu, Zn, Ga, Ge, Pd, Ag, Cd, In, Sn, Sb, Pt, Au, Hg, Tl, Pb, and Bi (listed in order of increasing atomic number). The results indicate that previously unknown XLi$_2$Mg compounds exist with X=Ni, Cu, Pd, Pt and that previously unknown XLi$_2$MgH$_n$ hydrides may form for all elements X considered. This discovery provides the basis for a hydrogen storage system comprising an easy-to-use combination of a non-hydrogen-containing base compound and its hydride, its hydrogen-containing analog. Hydrogen is released from the hydride by application of heat or the like to yield a non-hydride compound in which hydrogen may later be re-absorbed.

Computational methods in chemistry, coupled with advances in affordable computing power, are now able to compute, with reasonable precision, the electronic total energies of elements and compounds. In turn, these electronic total energies may be combined to derive the enthalpy of formation of compounds from their constituent elements. Hence the feasibility of forming previously-unknown compounds, such as those with potential for controlled uptake and release of hydrogen, may be investigated computationally.

The Vienna ab initio simulation package (VASP), a state-of-the-art method implementing density functional theory, was employed with projector-augmented wave potentials constructed using the generalized gradient approximation for the exchange-correlation energy functional. Given a crystal structure, VASP computes the electronic structure, including the total electronic energy $E_{el}$.

Two template structures, $\mathcal{P}$1 and $\mathcal{P}$2 ($\mathcal{P}$designating parent) were selected for the XLi$_2$Mg compounds. $\mathcal{P}$1 is described by the fcc F$\overline{4}$3m space group (No. 216) with X, Li, and Mg atoms occupying the 4a, (4b, 4c), and 4d sites, respectively. $\mathcal{P}$2 is the BiF$_3$-type (Fm$\overline{3}$m; No. 225) structure with X, Li, and Mg atoms on 4b, 8c, and 4a sites, respectively.

Eight XLi$_2$MgH$_n$ templates $\mathcal{H}$i ($\mathcal{H}$designating hydride) were constructed from two known hydride structures. Seven of these were derived from the disordered tetragonal (P4/mmm; No. 123) PdSr$_2$LiH$_5$ structure. Enthalpies of formation $\Delta$H were obtained for each template structure from differences of electronic total energies:

$$\Delta H(XLi_2Mg) = E_{el}(XLi_2Mg) - E_{el}(X) - 2E_{el}(Li) - E_{el}(Mg) \quad (1)$$

for the parent compounds, and $$\Delta H(XLi_2MgH_n) = (2/n)[E_{el}(XLi_2MgH_n) - E_{el}(X) - 2E_{el}(Li) - Eel(Mg) - (n/2)E_{el}(H_2)] \quad (2)$$

for the hydrides, where n is the number of H atoms in a given configuration. Each $\Delta$H, specified per XLi$_2$Mg formula unit (f. u.) in Eq. (1) and per H$_2$ molecule in Eq. (2), is the standard enthalpy of formation at zero temperature in the absence of zero point energy contributions. A negative $\Delta$H indicates stability of the material relative to its elemental metal and molecular H$_2$ constituents.

Thus, a group of new hydrides are provided as compounds capable of releasing hydrogen for a hydrogen-consuming device. These new compounds are XLi$_2$MgH$_n$, where X will typically be any one of the elements Al, Sc, Ti, V, Cr, Mn, Fe, Co, Ni, Cu, Zn, Ga, Ge, Pd, Ag, Cd, In, Sn, Sb, Pt, Au, Hg, Tl, Pb, and Bi, and n is an integer having a value of 1 to 8 and, preferably, 4-7. In preferred hydrogen storage systems, these new hydrides, typically stored as a body of particles, release their hydrogen upon heating to yield a solid de-hydrogenated compound to which hydrogen may subsequently be restored. The original hydride may be restored by contacting the base compounds with hydrogen under suitable pressure and temperature conditions.

Other objects and advantages of the invention will be apparent from the following description of preferred embodiments.

DESCRIPTION OF PREFERRED EMBODIMENTS

State-of-the-art computational electronic structure methods implementing density functional theory (DFT) have been employed with substantial success to model hydride properties, including the crucial enthalpies of formation. That success encourages the development of strategies for harnessing these calculation tools to guide the discovery of novel hydrides. The approach in this case is to choose a related compound having a known crystal structure and calculate enthalpies of formation for isostructural, hypothetical compounds constructed by elemental replacement. In a further step, a parallel process is followed for a hypothetical hydride derived from the hypothetical compound through the addition of hydrogen to the original lattice.

The goal is to identify compounds which may take up and release hydrogen in a reversible manner. Thus in pursuing computational approaches using isostructural templates to guide the calculation, at least one template, for the compound itself, is required. This represents the simplest outcome and physically corresponds to a situation where the template structure of the compound is sufficiently open to accommodate hydrogen without distorting the structure. If this situation does not arise, then one template structure will be required for the compound and another for the hydride.

In practice of this invention it has been found that even this situation is inadequate to fully capture the complexities of the reaction. First, more than one compound template is required and these will be designated as $\mathcal{P}1$ and $\mathcal{P}2$ and then eight template structures, designated as $\mathcal{H}1$-$\mathcal{H}8$, are required for the hydride. Details are provided in subsequent sections but it should be emphasized that the structural choices are not arbitrary but are guided and informed by the known behavior of either representative examples of the family of compounds or by knowledge of analogous compounds.

For the compounds, $XLi_2Mg$, two template structures are considered, both face-centered cubic. The choice is based on crystallographic information available for known $XLi_2Mg$ ternary compounds which include Ag, Al, Au, Bi, Cd, Ga, Ge, Hg, In, Pb, Sb, Sn, Tl and Zn. Of these, all are disordered with the exception of $PbLi_2Mg$ and an ordered variant of $TlLi_2Mg$. The disordered structures possess 4 Li and 4 Mg, or 4 X and 4 Mg atoms on an 8-fold site in the conventional cell of either the $BiF_3$-type (Fm$\bar{3}$m; No. 225) or NaTl-type (Fd$\bar{3}$m; No. 227) space group. To circumvent the necessity to construct large super cells which would significantly increase the computational demand, these structures were analyzed using four ordered analogous structures. These were constructed by enforcing the placement of either one Li and one Mg atom, or of one X and one Mg atom, on either of the two sites in the primitive cell.

Figure 1:
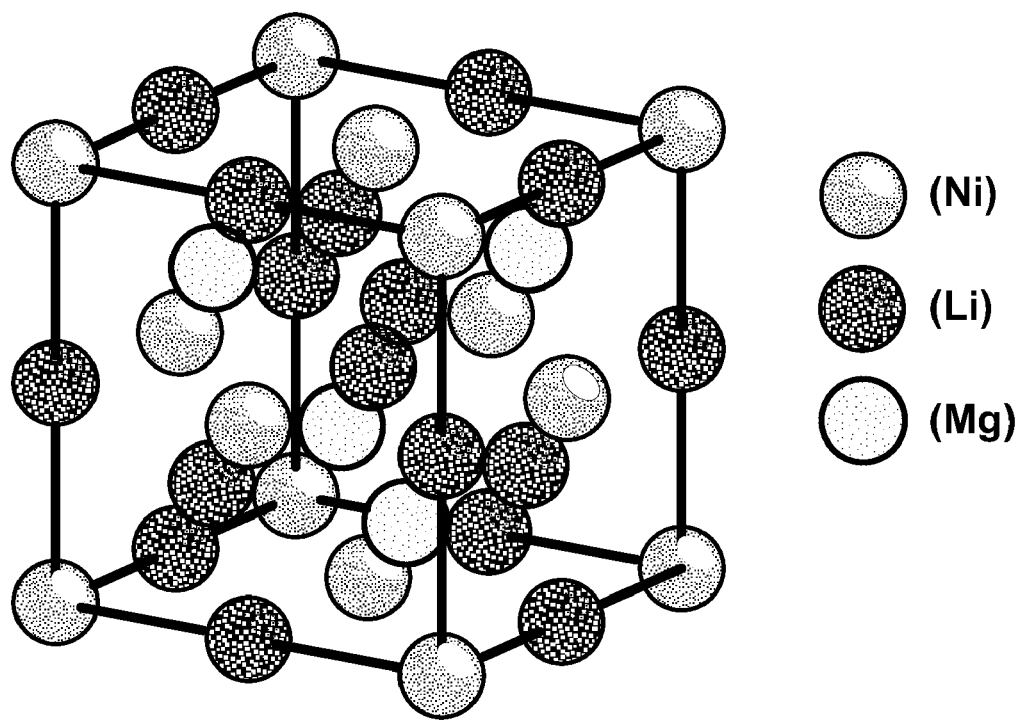
FIG. 1 shows proposed compound NiLi$_2$Mg in the cubic F$\overline{4}$3m structure corresponding to the $\mathcal{P}$1 template.

These four ordered structures can all be described by the fcc F$\bar{4}$3m space group (No. 216) with X, Li, and Mg atoms occupying the 4a, (4b, 4c), and 4d sites, respectively. This was chosen as template $\mathcal{P}1$ whose structure is shown in FIG. 1, for the proposed compound $NiLi_2Mg$. The validity of this choice was assessed by comparing computed X-ray powder diffraction patterns for $AgLi_2Mg$ in the disordered form and in the ordered $\mathcal{P}1$ template form. The computed X-ray powder diffraction patterns are virtually indistinguishable, demonstrating that the $\mathcal{P}1$ template form is an excellent approximation to the observed disordered structure.

The ordered structures represented by $PbLi_2Mg$ and ordered $TlLi_2Mg$ are both $BiF_3$-type (Fm$\bar{3}$m; No. 225) with X, Li, and Mg atoms on 4b, 8c, and 4a sites, respectively. This structure was selected as the second parent template, $\mathcal{P}2$.

There are multiple available sites in the $\mathcal{P}1$ template structure for incorporation of hydrogen atoms. To identify a structural template for the hydride, preliminary computations were performed to assess the stability of hydrides based on the structure of $AgLi_2Mg$. Various numbers of hydrogen atoms were inserted at various locations in the $\mathcal{P}1$ lattice and the stability of the resulting hydrides $AgLi_2MgH_n$ evaluated.

The results indicated that stable hydrides would not form and thus that this structure is not a suitable template for the hydride.

Consideration was then given to structures of lower symmetry. Eight $XLi_2MgH_n$ templates $\mathcal{H}i$ ($\mathcal{H}$ designating hydride) were constructed from two known hydride structures having lower lattice symmetries. Seven of these were derived from the disordered tetragonal (P4/mmm; No. 123) $PdSr_2LiH_5$ structure and satisfied the cases when n, the number of hydrogen atoms, was 4, 5 or 6. For the case where the case of 7 hydrogen atoms the template structure was derived from the ordered hexagonal (P6$_3$/mmc; No. 194) $RuMg_2LiH_7$ structure.

To progress from the known $PdSr_2LiH_5$ to the desired $XLi_2MgH_n$ structure the following atom substitutions are first made to transform the parent $PdSr_2Li$ atom placement into an atom placement for the desired parent $XLi_2Mg$. X is substituted for Pd; Li is substituted for Sr; and Mg is substituted for Li. This locates X, Li, and Mg on the 1a, 2 h, and 1b sites in P4/mmm, respectively. To progress from the known $RuMg_2Li$ atom placement to the desired $XLi_2Mg$ atom placement, X is substituted for Ru; Mg is substituted for Li; and Li is substituted for Mg.

In the hydride $PdSr_2LiH_5$ the H atoms occupy the 2e, 2g, and one of the 2f sites. Seven $XLi_2MgH_n$ templates with n=4, 5, and 6 were generated by various fillings of these, with the eighth template based on $RuMg_2LiH_7$. The templates are:

$\mathcal{H}1$-$XLi_2MgH_4$ with four H atoms on the 2e and 2f sites. The P4/mmm space group symmetry (of $PdSr_2LiH_5$) is preserved.

$\mathcal{H}2$-$XLi_2MgH_4$ with four H atoms on the 2e and 2g sites. The P4/mmm space group symmetry (of $PdSr_2LiH_5$) is maintained.

Figure 2:
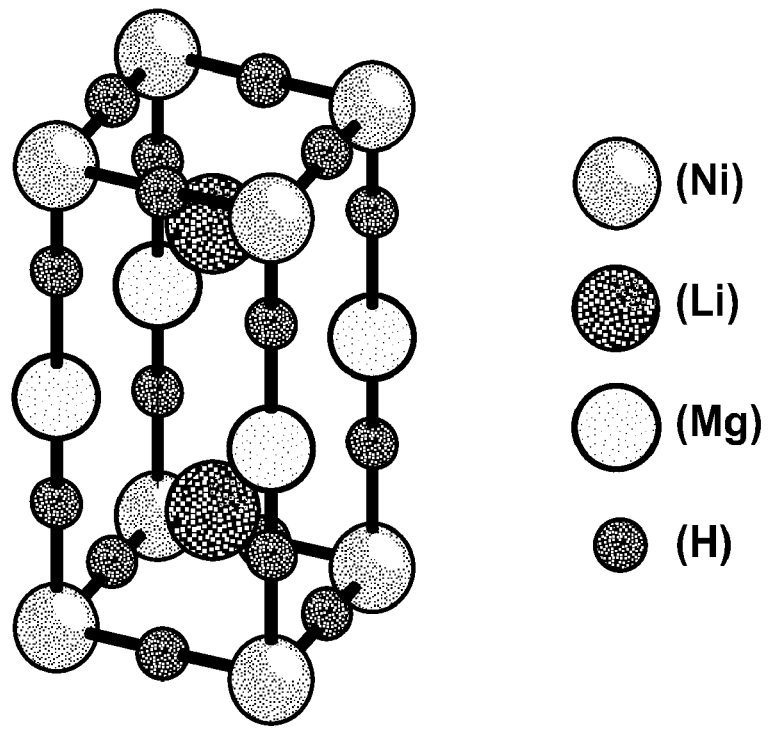
FIG. 2 shows the proposed NiLi$_2$MgH$_4$ compound in the tetragonal P4/mmm structure corresponding to the $\mathcal{H}$3 template.

$\mathcal{H}3$-$XLi_2MgH_4$ with four H atoms on the 2f and 2g sites. The structure remains P4/mmm. This structure is shown in FIG. 2 for the proposed compound $NiLi_2MgH_4$.

$\mathcal{H}4$-$XLi_2MgH_5$ with five H atoms occupying one of the 2e and all 2f, 2g sites. This structure is equivalent to an ordered orthorhombic Pmmm (No. 47) lattice with X (1a), Li (2l), Mg (1b), and H (1c, 1e, 1f, and 2i) sites.

$\mathcal{H}5$-$XLi_2MgH_5$ with five H atoms occupying one of the 2f and all 2e, 2g sites. This structure can also be described as ordered orthorhombic Pmmm with X (1a), Li (2l), Mg (1b), and H (1c, 1d, 1f, and 2i) sites.

$\mathcal{H}6$-$XLi_2MgH_5$ with five H atoms occupying one of the 2g and all 2e, 2f sites. This structure is equivalent to an ordered tetragonal P4m (No. 99) lattice with X (1a$_1$), Li (1b$_1$, 1b$_2$), Mg (1a$_2$), and H (1a$_3$, 2c$_1$, and 2c$_2$) sites.

$\mathcal{H}7$-$XLi_2MgH_6$ with six H atoms on the 2e, 2f, and 2g sites. The space group symmetry is again P4/mmm.

$\mathcal{H}8$-$XLi_2MgH_7$ ordered hexagonal (P6$_3$/mmc; No. 194). The populated sites are X (2a), Li (4f), Mg (2b), and H (2c, 12k).

Since the purpose of the calculations is to identify previously unknown compounds and hydrides, there can be no foreknowledge of which compounds or hydrides are stable, and if stable, what structure they will adopt. Hence calculations must be made for both parent structures and for all eight hydride structures.

Electronic total energies $E_{el}$ were calculated with the Vienna ab initio simulation package (VASP), which implements DFT using a plane wave basis set. Projector-augmented wave potentials were employed for the elemental constituents, and the generalized gradient approximation (GGA) of Perdew and Wang was used for the exchange-correlation energy functional $\mu_{xc}$. Non-magnetic calculations were performed for all materials with the exception of those with X=Fe, Co, Ni, and Pd, for which spin-polarized calculations were done to assess the possibility of magnetic states In all cases a 900 eV plane wave cutoff energy was imposed. The number of points in the irreducible Brillouin zone for the k-space meshes utilized was 60 ($\mathcal{P}1$, $\mathcal{P}2$), 125 ($\mathcal{H}4$, $\mathcal{H}5$), 126 ($\mathcal{H}1$, $\mathcal{H}2$, $\mathcal{H}3$, $\mathcal{H}6$, $\mathcal{H}7$), and 133 ($\mathcal{H}8$). At least two simultaneous relaxations of the lattice constants and nuclear coordinates not fixed by the space group were carried out. The electronic total energies and forces were converged to $10^{-6}$ eV/cell and $10^{-3}$ eV/Å, respectively. Calculations for the $H_2$ molecule and the elemental metals were performed with the same computational machinery to the same levels of precision.

Enthalpies of formation $\Delta H$ were obtained from differences of electronic total energies:

$$\Delta H(XLi_2Mg) = E_{el}(XLi_2Mg) - E_{el}(X) - 2E_{el}(Li) - E_{el}(Mg)$$

for the parent compounds, and $$\Delta H(XLi_2MgH_n) = (2/n)[E_{el}(XLi_2MgH_n) - E_{el}(X) - 2E_{el}(Li) - E_{el}(Mg) - (n/2)E_{el}(H_2)]$$

for the hydrides, where $E_{el}(Y)$ is the electronic total energy of constituent Y and n is the number of H atoms in a given configuration. Each $\Delta H$, specified per $XLi_2Mg$ formula unit (f. u.) in Eq. (1) and per $H_2$ molecule in Eq. (2), is the standard enthalpy of formation at zero temperature in the absence of zero point energy contributions.

TABLE I

| Compound | $\Delta H(XLi_2Mg)$ (kJ/mole f.u.) | |
|---|---|---|
| | $\mathcal{P}_1$ | $\mathcal{P}_2$ |
| AlLi₂Mg | −53 | −47 |
| ScLi₂Mg | 54 | 35 |
| TiLi₂Mg | 137 | 121 |
| VLi₂Mg | 228 | 219 |
| CrLi₂Mg | 280 | 279 |
| MnLi₂Mg | 240 | 248 |
| FeLi₂Mg | 115 | 123 |
| CoLi₂Mg | 76 | 98 |
| NiLi₂Mg | −17 | 8 |
| CuLi₂Mg | −25 | −8 |
| ZnLi₂Mg | −57 | −46 |
| GaLi₂Mg | −97 | −84 |
| GeLi₂Mg | −136 | −115 |

TABLE I-continued

| Compound | $\Delta H(XLi_2Mg)$ (kJ/mole f.u.) | |
|---|---|---|
| | $\mathcal{P}_1$ | $\mathcal{P}_2$ |
| PdLi₂Mg | −163 | −139 |
| AgLi₂Mg | −79 | −68 |
| CdLi₂Mg | −78 | −75 |
| InLi₂Mg | −101 | −96 |
| SnLi₂Mg | −142 | −134 |
| SbLi₂Mg | −126 | −155 |
| PtLi₂Mg | −220 | −195 |
| AuLi₂Mg | −180 | −163 |
| HgLi₂Mg | −117 | −108 |
| TlLi₂Mg | −89 | −82 |
| PbLi₂Mg | −111 | −107 |
| BiLi₂Mg | −112 | −135 |

A negative $\Delta H$ indicates stability of the material relative to its elemental metal and molecular $H_2$ constituents. Table I lists $\Delta H(XLi_2Mg)$ calculated according to Eq. (1) for all known $XLi_2Mg$ compounds as well as for those with X=Sc—Cu, Pd, and Pt for structures based on both the $\mathcal{P}1$ and $\mathcal{P}2$ templates. In qualitative agreement with experiment, $\Delta H$ is negative for all the materials reported to form (shown in underlined bold in Table I) using either template. In these cases the lower $\Delta H$ value corresponds to the observed structure except for PbLi₂Mg, TlLi₂Mg and BiLi₂Mg. For PbLi₂Mg and TlLi₂Mg the energy differences are modest but the energy difference for the BiLi₂Mg is relatively large and may merit additional review of the experimental diffraction analyses.

For the group of compounds not previously reported, $\Delta H$ is large and positive for $XLi_2Mg$ with X=Sc, Ti, V, Cr, Mn, Fe, and Co, indicating that the compounds likely do not exist. For NiLi₂Mg, CuLi₂Mg, PdLi₂Mg, and PtLi₂Mg, however, negative $\Delta H$ values are obtained, raising the possibility that these materials form. $\Delta H$ is especially large and negative for the Pd and Pt compounds in either the $\mathcal{P}1$ or $\mathcal{P}2$ template.

Turning now to the hydrides, enthalpies of formation relative to the elemental metals and $H_2$ for the $XLi_2MgH_n$ hydrides in the eight $\mathcal{H}i$ template structures are presented in Table II. At least one, and in most cases several, negative $\Delta H$ values are obtained for every X, raising the possibility of hydride formation in each case. For each X the lowest $\Delta H$ value is shown in bold underline and Table III summarizes the minimum $\Delta H$ results from Table II and includes the hydrogen mass percentage for each hydride.

TABLE II

| | $\Delta H(XLi_2MgH_n)$ (kJ/mole $H_2$) | | | | | | | | | | | |
|---|---|---|---|---|---|---|---|---|---|---|---|---|
| | X | | | | | | | | | | | |
| $\mathcal{H}_i$ (n) | Al | Sc | Ti | V | Cr | Mn | Fe | Co | Ni | Cu | Zn | Ga | Ge |
| $\mathcal{H}_1$ (4) | −7 | −23 | 6 | 42 | 61 | 41 | 4 | −22 | −51 | −23 | −7 | −11 | −20 |
| $\mathcal{H}_2$ (4) | −4 | −32 | 14 | 60 | 92 | 83 | 23 | 6 | −36 | −24 | −6 | −9 | −6 |
| $\mathcal{H}_3$ (4) | −7 | −53 | −43 | −21 | −8 | −33 | −62 | −88 | −87 | −31 | −3 | 25 | 58 |
| $\mathcal{H}_4$ (5) | −4 | −52 | −39 | −15 | −1 | −18 | −38 | −55 | −56 | −22 | −3 | 17 | 40 |
| $\mathcal{H}_5$ (5) | −12 | −43 | −23 | 8 | 32 | 20 | −13 | −30 | −54 | −27 | −15 | −3 | 6 |
| $\mathcal{H}_6$ (5) | −32 | −86 | −42 | −11 | 5 | −9 | −34 | −50 | −71 | −51 | −24 | −15 | −9 |

TABLE II-continued

| | ΔH(XLi$_2$MgH$_n$) (kJ/mole H$_2$) | | | | | | | | | | | |
|---|---|---|---|---|---|---|---|---|---|---|---|---|
| $\mathcal{H}_7$ (6) | −13 | −66 | −51 | −27 | −12 | −24 | −42 | −59 | −62 | −26 | −23 | −4 | 16 |
| $\mathcal{H}_8$ (7) | −30 | −16 | −6 | 5 | 4 | −22 | −59 | −89 | −54 | 3 | 26 | 8 | 42 |

| | X | | | | | | | | | | | |
|---|---|---|---|---|---|---|---|---|---|---|---|
| $\mathcal{H}_{i\,(n)}$ | Pd | Ag | Cd | In | Sn | Sb | Pt | Au | Hg | Tl | Pb | Bi |
| $\mathcal{H}_1$ (4) | −98 | −18 | 11 | 10 | 0 | 4 | −112 | −56 | 9 | 35 | 23 | 27 |
| $\mathcal{H}_2$ (4) | −88 | −29 | −14 | −25 | −26 | −17 | −102 | −64 | −28 | −30 | −32 | −22 |
| $\mathcal{H}_3$ (4) | −79 | 16 | 47 | 63 | 81 | 104 | −96 | −4 | 65 | 98 | 109 | 121 |
| $\mathcal{H}_4$ (5) | −59 | 5 | 28 | 39 | 54 | 75 | −72 | −4 | 44 | 67 | 73 | 87 |
| $\mathcal{H}_5$ (5) | −81 | −17 | 0 | 2 | 10 | 28 | −98 | −41 | 2 | 12 | 14 | 30 |
| $\mathcal{H}_6$ (5) | −91 | −35 | −3 | −28 | −9 | 6 | −94 | −55 | 2 | −17 | −1 | 10 |
| $\mathcal{H}_7$ (6) | −69 | −3 | 1 | 14 | 32 | 55 | −85 | −20 | 16 | 33 | 43 | 63 |
| $\mathcal{H}_8$ (7) | −42 | 40 | 60 | 44 | 60 | 58 | −68 | 16 | 75 | 91 | 91 | 66 |

TABLE III

| XLi$_2$MgH$_n$ hydride ($\mathcal{H}_i$) | ΔH(XLi$_2$MgH$_n$) (kJ/mole H$_2$) | ΔH*(XLi$_2$MgH$_n$) (kJ/mole H$_2$) | mass % H |
|---|---|---|---|
| AlLi$_2$MgH$_5$ ($\mathcal{H}_6$) | −32 | −11 | 7.2 |
| ScLi$_2$MgH$_5$ ($\mathcal{H}_6$) | −86 | — | 5.7 |
| TiLi$_2$MgH$_6$ ($\mathcal{H}_7$) | −51 | — | 6.6 |
| VLi$_2$MgH$_6$ ($\mathcal{H}_7$) | −27 | — | 6.4 |
| CrLi$_2$MgH$_6$ ($\mathcal{H}_7$) | −12 | — | 6.3 |
| MnLi$_2$MgH$_4$ ($\mathcal{H}_3$) | −33 | — | 4.1 |
| FeLi$_2$MgH$_4$ ($\mathcal{H}_3$) | −62 | — | 4.1 |
| CoLi$_2$MgH$_7$ ($\mathcal{H}_8$) | −89 | — | 6.8 |
| NiLi$_2$MgH$_4$ ($\mathcal{H}_3$) | −87 | −79 | 4.0 |
| CuLi$_2$MgH$_5$ ($\mathcal{H}_6$) | −51 | −41 | 4.7 |
| ZnLi$_2$MgH$_5$ ($\mathcal{H}_6$) | −24 | −1 | 4.6 |
| GaLi$_2$MgH$_5$ ($\mathcal{H}_6$) | −15 | +24 | 4.5 |
| GeLi$_2$MgH$_4$ ($\mathcal{H}_1$) | −20 | +48 | 3.5 |
| PdLi$_2$MgH$_4$ ($\mathcal{H}_1$) | −98 | −16 | 2.7 |
| AgLi$_2$MgH$_5$ ($\mathcal{H}_6$) | −35 | −4 | 3.3 |
| CdLi$_2$MgH$_4$ ($\mathcal{H}_2$) | −14 | +25 | 2.6 |
| InLi$_2$MgH$_5$ ($\mathcal{H}_6$) | −28 | +13 | 3.2 |
| SnLi$_2$MgH$_4$ ($\mathcal{H}_2$) | −26 | +45 | 2.5 |
| SbLi$_2$MgH$_4$ ($\mathcal{H}_2$) | −17 | +61 | 2.5 |
| PtLi$_2$MgH$_4$ ($\mathcal{H}_1$) | −112 | −2 | 1.7 |
| AuLi$_2$MgH$_4$ ($\mathcal{H}_2$) | −64 | +26 | 1.7 |
| HgLi$_2$MgH$_4$ ($\mathcal{H}_2$) | −28 | +30 | 1.7 |
| TlLi$_2$MgH$_4$ ($\mathcal{H}_2$) | −30 | +14 | 1.6 |
| PbLi$_2$MgH$_4$ ($\mathcal{H}_2$) | −32 | +23 | 1.6 |
| BiLi$_2$MgH$_4$ ($\mathcal{H}_2$) | −22 | +46 | 1.6 |

According to the van't Hoff relation $$\ln p/p_0 = \Delta H/RT - \Delta S/R,$$

where ΔS is the entropy of formation and R the gas constant, the configuration having the most negative ΔH is that which is stable at the lowest H$_2$ pressure p.

For controlled and repeated hydrogen uptake and release, it is more desirable to have XLi$_2$MgH$_n$ release hydrogen while reverting to XLi$_2$Mg than to have XLi$_2$MgH$_n$ revert to its constituent elements while releasing hydrogen. The preferred reversible reaction is then:

$$XLi_2MgH_n \leftrightarrow XLi_2Mg + n/2 H_2,$$

and the formation enthalpy of the hydride with respect to its parent compound, ΔH*(XLi$_2$MgH$_n$), is given by:

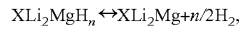

Listings of ΔH*(XLi$_2$MgH$_n$) are also given in Table III. For AlLi$_2$MgH$_5$, NiLi$_2$MgH$_4$, CuLi$_2$MgH$_5$, ZnLi$_2$MgH$_5$, PdLi$_2$MgH$_4$, AgLi$_2$MgH$_5$, and PtLi$_2$MgH$_4$ ΔH*(XLi$_2$MgH$_n$)<0 in Table III and a stable parent is either known (AlLi$_2$Mg, ZnLi$_2$Mg, AgLi$_2$Mg) or predicted (NiLi$_2$Mg, CuLi$_2$Mg, PdLi$_2$Mg, PtLi$_2$Mg) to exist (cf. Table I) suggesting the desirable possibility of cycling between the two according to the reaction given above.

AgLi$_2$MgH$_5$ ($\mathcal{H}_6$) is the only Ag hydride with ΔH*<0. For X=Al, Ni, Cu, Zn, Pd, and Pt, all of which also feature stable parent compounds in Table I, it is important to observe that there are at least two hydrides having ΔH*(XLi$_2$MgH$_n$)<0. The hydride with the minimum ΔH* (and hence the most stable with respect to its parent) is listed in Table IV. Only the X=Ni, Cu, and Ag entries are common to Table III and Table IV; for the others (X=Al, Zn, Pd, Pt) the hydride most stable with respect to the elemental components differs from that which is most stable relative to the parent, with the latter having a larger hydrogen content n. The materials in Table IV are the preferred members of the XLi$_2$Mg/XLi$_2$MgH$_n$ class of compounds for reversible hydrogen storage.

TABLE IV

| XLi$_2$MgH$_n$ hydride ($\mathcal{H}_i$) | ΔH(XLi$_2$MgH$_n$) (kJ/mole H$_2$) | ΔH*(XLi$_2$MgH$_n$) (kJ/mole H$_2$) | mass % H |
|---|---|---|---|
| AlLi$_2$MgH$_7$ ($\mathcal{H}_8$) | −30 | −15 | 9.8 |
| NiLi$_2$MgH$_4$ ($\mathcal{H}_3$) | −87 | −79 | 4.0 |

TABLE IV-continued

| $XLi_2MgH_n$ hydride ($\mathcal{H}_i$) | $\Delta H(XLi_2MgH_n)$ (kJ/mole $H_2$) | $\Delta H^*(XLi_2MgH_n)$ (kJ/mole $H_2$) | mass % H |
|---|---|---|---|
| $CuLi_2MgH_5$ ($\mathcal{H}_6$) | −51 | −41 | 4.7 |
| $ZnLi_2MgH_6$ ($\mathcal{H}_7$) | −23 | −4 | 5.5 |
| $PdLi_2MgH_5$ ($\mathcal{H}_6$) | −91 | −26 | 3.4 |
| $AgLi_2MgH_5$ ($\mathcal{H}_6$) | −35 | −4 | 3.3 |
| $PtLi_2MgH_6$ ($\mathcal{H}_7$) | −85 | −11 | 2.5 |

Thus, a family of hydrides is provided as follows: $AlLi_2MgH_n$, $ScLi_2MgH_n$, $TiLi_2MgH_n$, $VLi_2MgH_n$, $CrLi_2MgH_n$, $MnLi_2MgH_n$, $FeLi_2MgH_n$, $CoLi_2MgH_n$, $NiLi_2MgH_n$, $CuLi_2MgH_n$, $ZnLi_2MgH_n$, $GaLi_2MgH_n$, $GeLi_2MgH_n$, $PdLi_2MgH_n$, $AgLi_2MgH_n$, $CdLi_2MgH_n$, $InLi_2MgH_n$, $SnLi_2MgH_n$, $SbLi_2MgH_n$, $PtLi_2MgH_n$, $AuLi_2MgH_n$, $HgLi_2MgH_n$, $TlLi_2MgH_n$, $PbLi_2MgH_n$, and $BiLi_2MgH_n$.

In these hydride formulas, n is an integer having a value from 4 to 7.

Particles of one or more of these compositions may be used in a suitable, predetermined mass to release a desired quantity of hydrogen upon heating for delivery to a hydrogen-consuming device. Upon release of hydrogen they may revert to like hydrogen-depleted analogs. Hydrogen may be reacted with the analogs to restore the hydrides for re-use.

The invention claimed is:

1. Any one or more of the hydrides having a compositional formula selected from the group consisting of $AlLi_2MgH_n$, $ScLi_2MgH_n$, $TiLi_2MgH_n$, $VLi_2MgH_n$, $CrLi_2MgH_n$, $MnLi_2MgH_n$, $FeLi_2MgH_n$, $CoLi_2MgH_n$, $NiLi_2MgH_n$, $CuLi_2MgH_n$, $ZnLi_2MgH_n$, $GaLi_2MgH_n$, $GeLi_2MgH_n$, $PdLi_2MgH_n$, $AgLi_2MgH_n$, $CdLi_2MgH_n$, $InLi_2MgH_n$, $SnLi_2MgH_n$, $SbLi_2MgH_n$, $PtLi_2MgH_n$, $AuLi_2MgH_n$, $HgLi_2MgH_n$, $TlLi_2MgH_n$, $PbLi_2MgH_n$, and $BiLi_2MgH_n$, where n is an integer having a value of 4 to 7.

2. One or more of the hydrides of claim 1 wherein the hydrides are selected from the group consisting of members having the compositional formula $AlLi_2MgH_n$, $ScLi_2MgH_n$, and $TiLi_2MgH_n$, where n is an integer having a value of 4 to 7.

3. One or more of the hydrides of claim 1 wherein the hydrides are selected from the group consisting of members having the compositional formula $VLi_2MgH_n$, $CrLi_2MgH_n$, and $MnLi_2MgH_n$, where n is an integer having a value of 4 to 7.

4. One or more of the hydrides of claim 1 wherein the hydrides are selected from the group consisting of members having the compositional formula $FeLi_2MgH_n$, $CoLi_2MgH_n$, and $NiLi_2MgH_n$, where n is an integer having a value of 4 to 7.

5. One or more of the hydrides of claim 1 wherein the hydrides are selected from the group consisting of members having the compositional formula $CuLi_2MgH_n$, $ZnLi_2MgH_n$, and $GaLi_2MgH_n$, where n is an integer having a value of 4 to 7.

6. One or more of the hydrides of claim 1 wherein the hydrides are selected from the group consisting of members having the compositional formula $GeLi_2MgH_n$, $PdLi_2MgH_n$, and $AgLi_2MgH_n$, where n is an integer having a value of 4 to 7.

7. One or more of the hydrides of claim 1 wherein the hydrides are selected from the group consisting of members having the compositional formula $CdLi_2MgH_n$, $InLi_2MgH_n$, and $SnLi_2MgH_n$, where n is an integer having a value of 4 to 7.

8. One or more of the hydrides of claim 1 wherein the hydrides are selected from the group consisting of members having the compositional formula $SbLi_2MgH_n$, $PtLi_2MgH_n$, and $AuLi_2MgH_n$, where n is an integer having a value of 4 to 7.

9. One or more of the hydrides of claim 1 wherein the hydrides are selected from the group consisting of members having the compositional formula $HgLi_2MgH_n$, $TlLi_2MgH_n$, $PbLi_2MgH_n$, and $BiLi_2MgH_n$, where n is an integer having a value of 4 to 7.

* * * * *